No. 798,875. PATENTED SEPT. 5, 1905.
J. F. CONE.
PLOW COLTER.
APPLICATION FILED NOV. 28, 1904.

WITNESSES
W. F. Doyle
M. A. Schmidt

INVENTOR
Jesse F. Cone.
BY
Milo B. Stevens and Co.
Attorneys.

UNITED STATES PATENT OFFICE.

JESSE FIELDER CONE, OF ASHBY, TEXAS.

PLOW-COLTER.

No. 798,875.     Specification of Letters Patent.     Patented Sept. 5, 1905.

Application filed November 28, 1904. Serial No. 234,612.

*To all whom it may concern:*

Be it known that I, JESSE FIELDER CONE, a citizen of the United States, residing at Ashby, in the county of Matagorda and State of Texas, have invented new and useful Improvements in Plow-Colters, of which the following is a specification.

My invention relates to plow-colters, and has for its object to provide a series of colters which are arranged to cut the soil into narrow strips when plowing, whereby it is thoroughly broken up and the formation of large lumps or clods prevented.

The invention consists in certain novel features of construction hereinafter described and claimed, reference being had to the accompanying drawings, in which—

Figure 1:
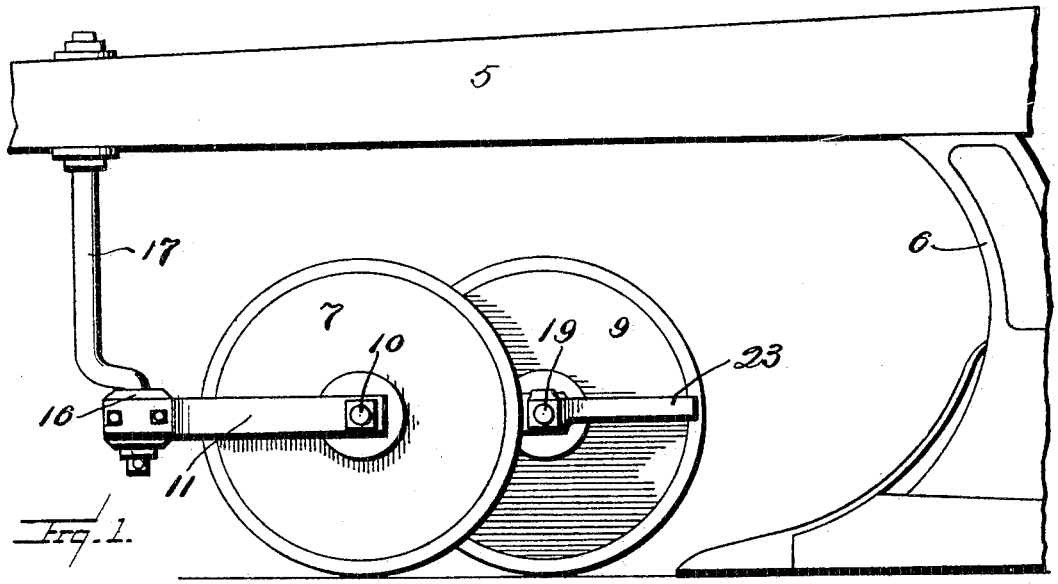
Figure 2:
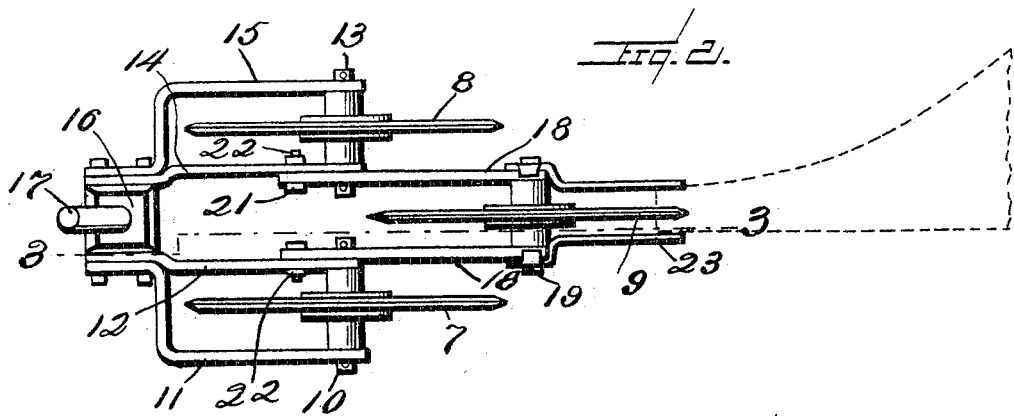
Figure 3:
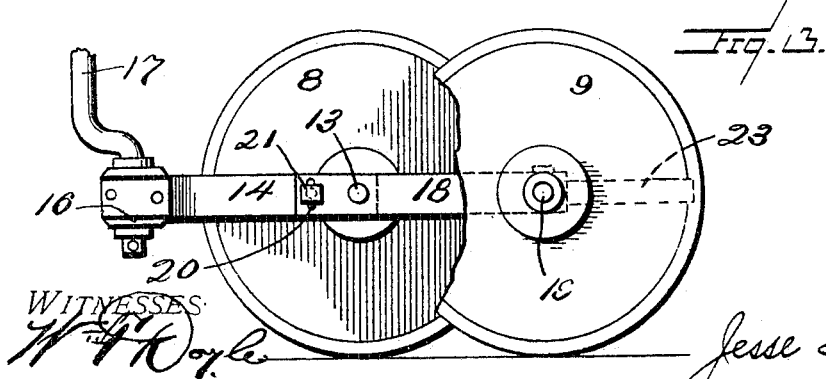

Figure 1 is a side elevation of a plow provided with my invention. Fig. 2 is a plan view thereof. Fig. 3 is a vertical section on the line 3 3 of Fig. 2.

Referring specifically to the drawings, 5 denotes the beam of a plow, and 6 the share. Nothing is claimed with respect to this, and the invention can be applied to any style of plow, such as a sulky, gang, or walking plow, the latter being shown in the drawings. The rotary colters are arranged in front of the share and are indicated at 7, 8, and 9, respectively. They are of the usual construction, being in the shape of disks and having sharp cutting edges. The colter 7 is mounted on an axle 10, which is secured in a frame comprising parallel side pieces 11 and 12. The axle 13 of the colter 8 is secured in a similar frame comprising parallel side pieces 14 and 15. The axles are at the rear ends of the respective frames, and at their front ends the frames are bolted or otherwise secured to a block 16, extending between the side pieces 12 and 14, whereby the frames are spaced to permit the mounting of the rear colter 9 therebetween. The block 16 receives the lower end of a stem 17, which is clamped to the plow-beam 5, the stem being swiveled in the block in any suitable manner. From the axles 10 and 13 arms 18 extend rearwardly, in which arms the axle 19 of the colter 9 is mounted. The colters 7 and 8 are arranged side by side, and the colter 9 is located between them, but somewhat behind them, for a purpose to be described hereinafter. The arms 18 are pivoted on the axles 10 and 13 to permit vertical adjustment of the rear colter 9. The front ends of the arms 18 are slotted, as at 20, through which slots bolts 21 extend. These bolts also extend through the parts 12 and 14 and are threaded to receive nuts 22, whereby when they are tightened the arms 18 will be securely clamped to the parts 12 and 14 and held in adjusted position. The amount of vertical adjustment of the rear colter is of course limited to the length of the slots 20. At 23 are indicated fenders which are carried on the axle 19 and extend along the sides of the rear colter 9. By arranging this colter behind the ones 7 and 8 and by the use of these fenders dirt and trash are prevented from collecting on the colters and choking them.

The colters do not increase the draft, but make the plow run lighter, as they cut up the soil into narrow strips, which break up and readily fall off the moldboard and offer but little resistance thereto, and as the colter-frame is swiveled the colters are free to swing and to adapt themselves to the line of motion and strain. The soil will be thoroughly broken up by the colters, and it has been found that the heaviest sod-land that has been cultivated one or more years needs no disking after plowing with my colters, and more than one-half of the disking will be saved on land that has never been broken. Any light land can be pulverized with a harrow after being plowed with my colters where otherwise it would take from two to three diskings and also the harrow to properly prepare the land. The use of my invention therefore results in a saving of time and labor and enables the farmer to prepare his field with less expense than in the usual way.

Having thus described my invention, what is claimed as new, and desired to be secured by Letters Patent, is—

1. The combination with a plow, of a frame carried by the beam; a pair of rotary colters mounted in said frame; a vertically-adjustable frame extending rearwardly from the first-mentioned frame; and a rotary colter mounted in the adjustable frame.

2. The combination with a plow, of a frame carried by the beam; a pair of rotary colters mounted in said frame; a vertically-adjustable frame extending rearwardly from the first-mentioned frame; a rotary colter mounted in the adjustable frame; and fenders extending along the sides of the last-mentioned colter.

In testimony whereof I have signed my name to this specification in the presence of two subscribing witnesses.

JESSE FIELDER CONE.

Witnesses:
  JAMES E. CONE,
  EVERETT LITTLETON.